April 29, 1952 R. F. BROUSSARD 2,594,388

AUTOMATIC PAY STATION

Filed Sept. 23, 1946 4 Sheets-Sheet 1

Inventor:
Robert F. Broussard
by Banning & Banning
Attorneys

April 29, 1952 R. F. BROUSSARD 2,594,388

AUTOMATIC PAY STATION

Filed Sept. 23, 1946 4 Sheets-Sheet 2

Inventor:
Robert F. Broussard
by [signature]
Attorneys

AUTOMATIC PAY STATION

Filed Sept. 23, 1946 4 Sheets-Sheet 3

Inventor:
Robert F. Broussard
by Munning & Munning
Attorneys

April 29, 1952 R. F. BROUSSARD 2,594,388

AUTOMATIC PAY STATION

Filed Sept. 23, 1946 4 Sheets-Sheet 4

Inventor:
Robert F. Broussard
by Dunning & Dunning
Attorneys

Patented Apr. 29, 1952

2,594,388

UNITED STATES PATENT OFFICE 2,594,388

AUTOMATIC PAY STATION

Robert F. Broussard, Houston, Tex., assignor to Duncan Parking Meter Corporation, Chicago, Ill., a corporation of Illinois Application September 23, 1946, Serial No. 698,678

14 Claims. (Cl. 194—1)

The present invention pertains in general to a machine which is designed to receive coins for a payment due or to be made, to retain a record of the depositor of the coin (or coins), and to provide the depositor with a receipt for the payment; and, in particular, to such a machine wherein the recording of the deposit is accomplished by severing a coupon from a ticket inserted in the machine by the payer, and wherein the deposit is validated by marking the portion of the ticket retained by the payer.

The machine of the present invention is applicable to many uses; for example, the deposit of money in a bank, the payment of insurance or other premiums, the settlement of gas, electric, and water bills, or of any indebtedness, account, fine, or the like.

The particular machine disclosed and described herein, by way of illustration of the invention, is especially designed for the settlement of traffic fines imposed by an on-the-spot officer whose authority extends to such an act. It should be understood, therefore, that the repeated reference to settlement of fines is but one of several examples of advantageous uses to which the present pay station may be put.

In any municipality, there are numerous ordinances which regulate the operation of vehicles and pedestrians for the convenience and safety of all concerned. As many of these ordinances relate to relatively minor offenses, only nominal fines are imposed for violations. For many citizens, the payment of these small fines is a nuisance since it results in a loss of a considerable amount of time, which may includes absence from work, particularly when the point at which payment must be made takes the offender far from his customary route.

When pay station machines constructed in accordance with the present invention are provided for the settlement of fines, a special ticket including one or more coupon portions is given to the violator by the arresting officer. The coupons each represent the value of a coin, such as a 50¢ piece, or a token. Hereinafter, the term "coin" is intended to include tokens.

The pay station of the invention is designed to sever and retain a coupon from the ticket upon insertion thereof in the machine concurrently with the deposit of a coin of appropriate value therein in payment of the fine. The machine, and ticket for use therewith, may be designed for recurrent operation when necessary for payment of more than one coin in settlement of the fine.

The pay station machine is further designed to stamp a receipt mark upon the stub portion of the ticked when deposit is made of the requisite coin in settlement of a prescribed fine. The ticket stub so marked may then be retained to serve as a valid receipt for the payment made.

Operation of the pay station machine is positively deferred until both the requisite coin and the ticket have been inserted in the machine. In particular, the design of the ticket and the machine are correlated to defer operation of the machine until the ticket is properly inserted therein; viz., with the coupon portion foremost and with the face side up, thereby assuring the payer of a valid receipt for settlement of the fine thus made.

The above and other objects of the invention will be more fully understood upon a perusal of the following specification taken in conjunction with the accompanying drawings, wherein.

Figures 2, 3, 4:
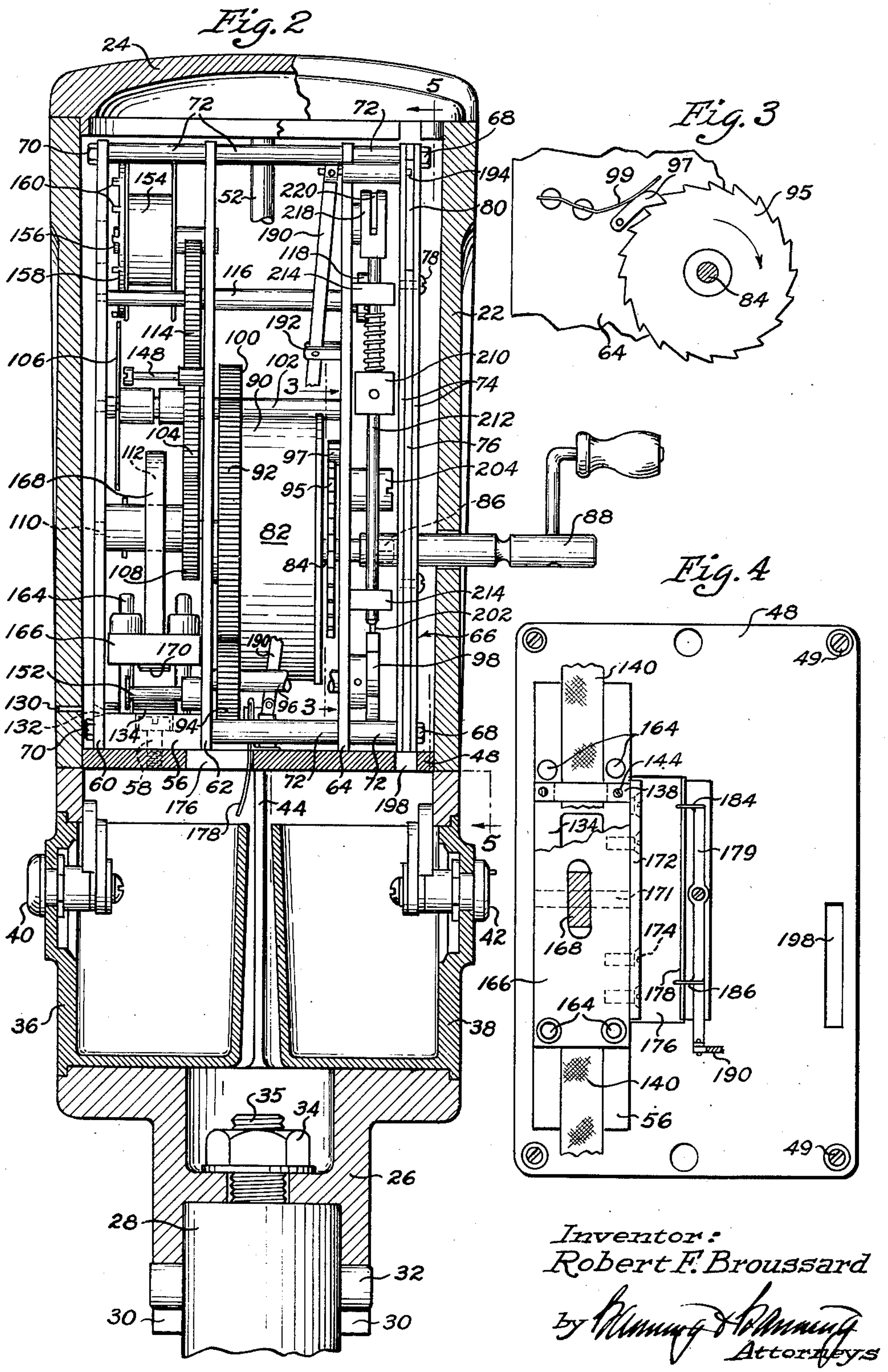
Fig. 2 is a sectional view of the machine as seen from the right of Fig. 1, taken along the line 2—2 therein.
Figure 5:
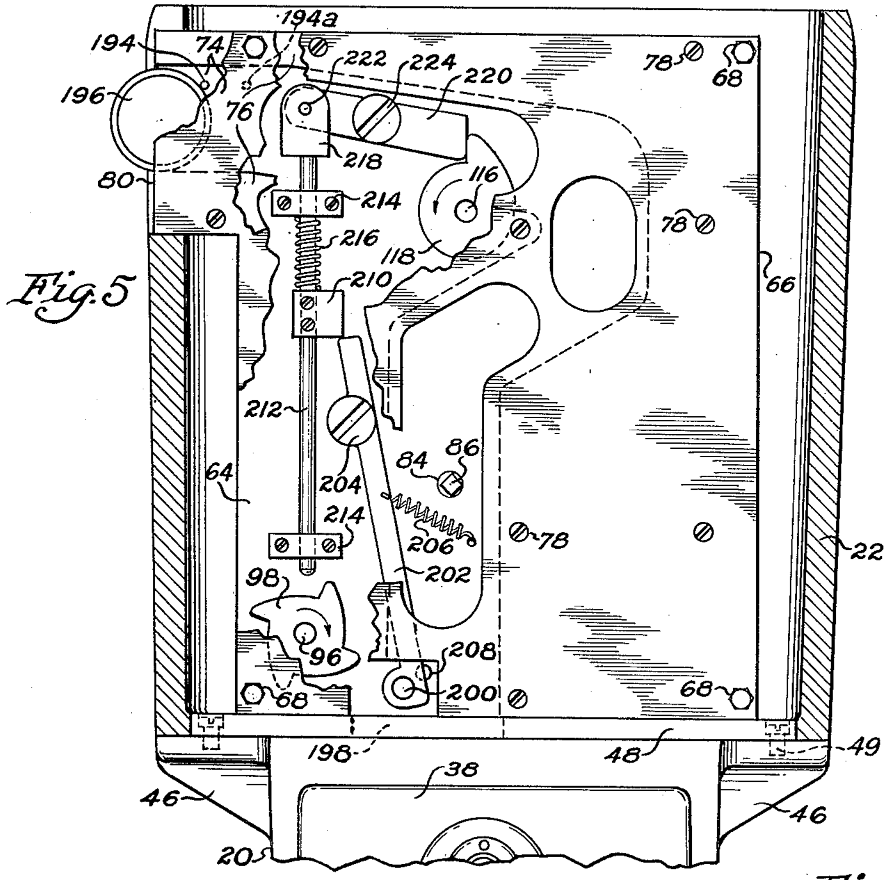
Figure 6:
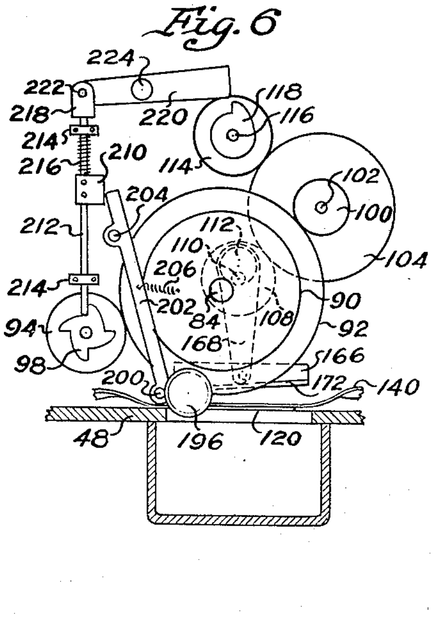
Figure 7:
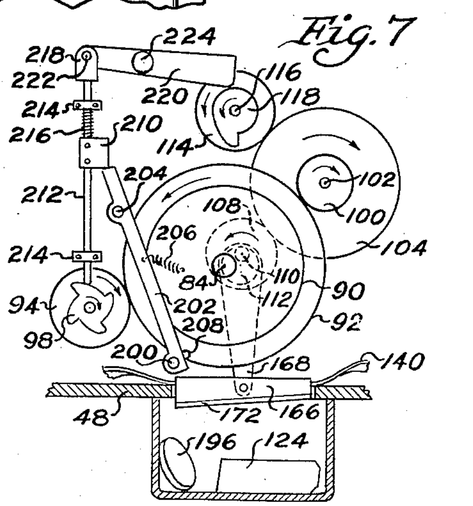
Figure 8:
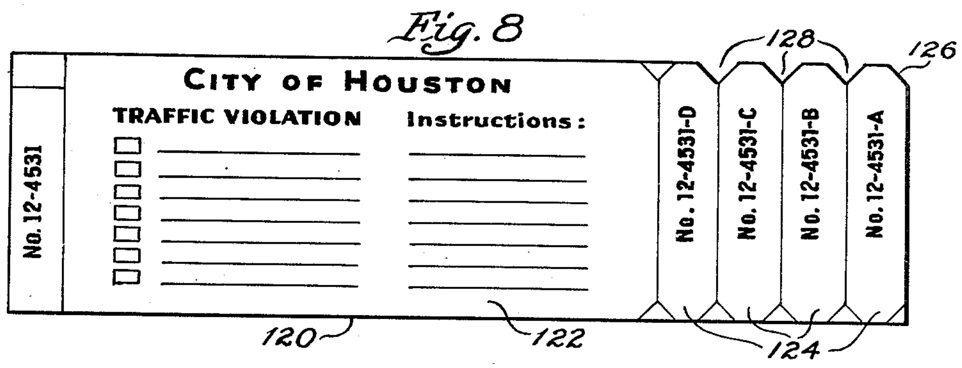
Figure 9:
Figure 10:
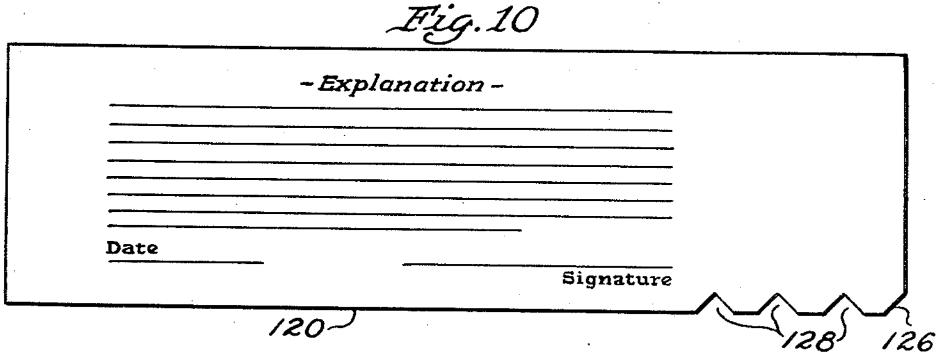
Figures 11, 12, 13:
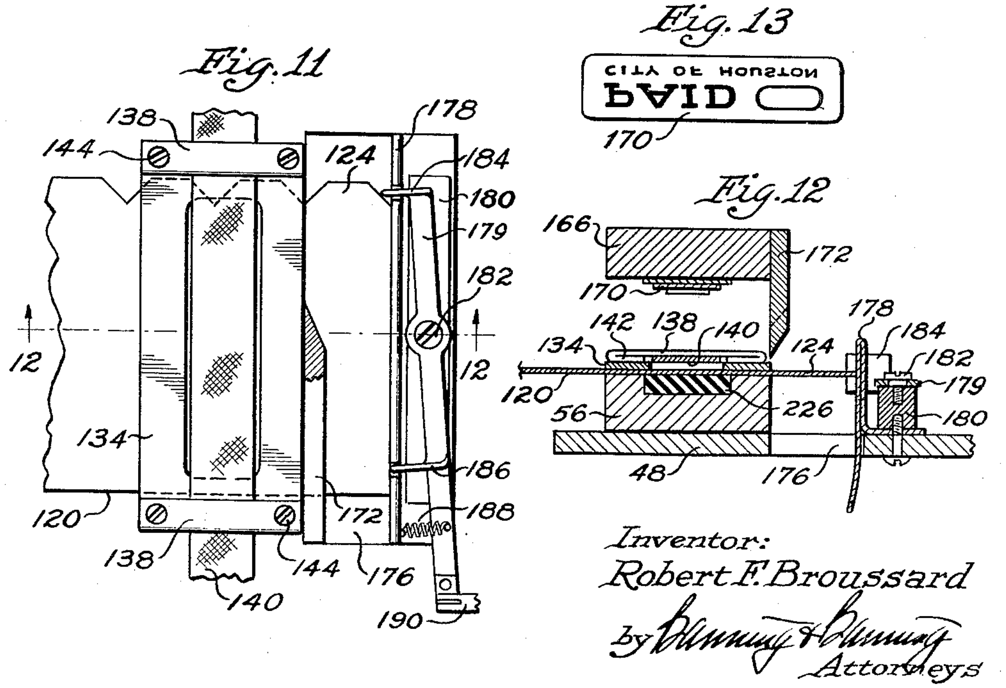

Fig. 3, which is a fragmentary detail in section, taken on line 3—3 of Fig. 2, illustrates a ratchet mechanism employed in conjunction with a spring motor which drives the machine;

Fig. 4 is a top plan view of a base plate and stamping and severing mechanism mounted thereon;

Fig. 5 is a fragmentary view in vertical section, taken on line 5—5 of Fig. 2;

Figs. 6 and 7 are diagrammatic views illustrating the sequence of operations of the machine;

Figs. 8, 9 and 10 are front, edge and rear views, respectively, of the special form of ticket used in conjunction with the machine;

Fig. 11 is a fragmentary detail view, similar to Fig. 4, illustrating the means whereby to assure proper positioning of a ticket when inserted in the machine;

Fig. 12 is a sectional view through the stamping and coupon mechanism shown in Fig. 11, taken along the line 12—12 therein; and Fig. 13 is a plan view of a typical form of printing plate or stamp which may be used to stamp PAID upon a ticket in pursuance of operation of the machine.

Figure 1:
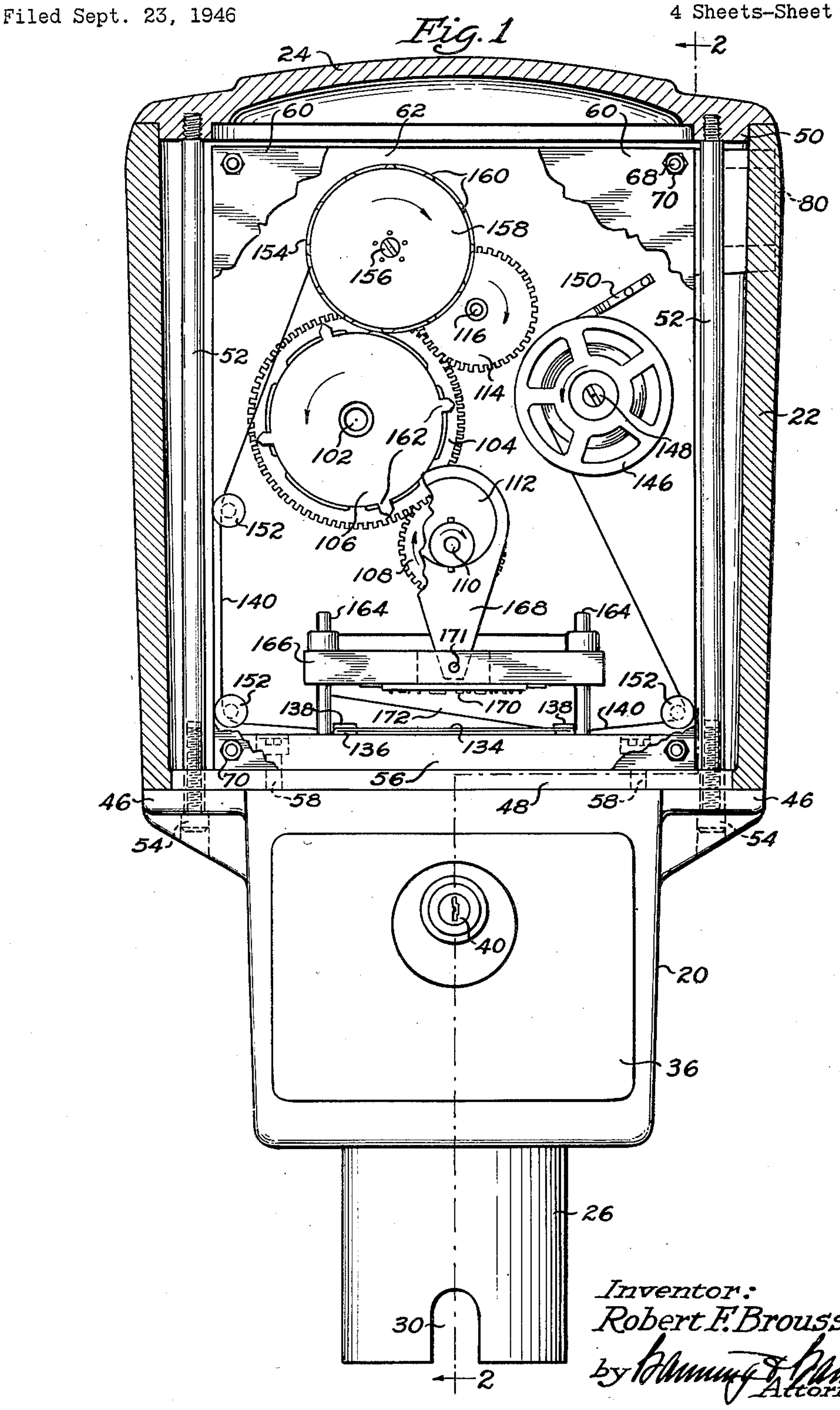
Fig. 1 is a front elevational view of the machine, with the upper part of the casing shown in section and with certain portions broken away to reveal details of the operating mechanism.

Referring particularly to Figs. 1 and 2, the pay station is contained in a housing including a base 20, a casing 22, and a cover or cap 24. The base 20 has a collar 26 extending from its under side and adapted to fit over a vertical supporting post 28. The collar 26 is provided with slots 30 which fit over a pin 32, extending transversely through the supporting post 28, to prevent rotation of the pay station on the supporting post. The base 20 may be secured to the post 28 as by means of a nut 34 which is threaded on a stud 35 extending from the top of the post. This nut is made inaccessible to unauthorized parties in order to prevent theft of the pay station.

The upper portion of the base 20 is box-like in form and is provided with openings in its opposite side walls for receiving drawers 36 and 38 which are provided with locks 40 and 42, respectively. A central web 44, extending from the end walls of the base 26 towards the center thereof and dividing the hollow interior of the base into two compartments, is provided to strengthen the end walls of the base. A gap is provided in the web 44 at the center of the base in order to afford access to the nut 34 when the drawers 36 and 38 are removed from the base.

The base 20 is provided with flanges 46 which extend from the end walls of the base along the upper edges thereof. These flanges, together with the web 44, support a base plate 48 on which the operating mechanism is mounted. The base plate 48 may be secured to the base 20 by means of four screws, such as 49 (Fig. 5), which pass through counterbored openings in the base plate into threaded openings in the base.

The open-ended box-like casing 22 rests on the flanges 46 and the side walls of the base 20. The upper end of the casing 22 is closed by the cap or cover 24 which is provided with a shoulder portion 50 that extends into the casing 22 to accurately position the cap on the casing and to provide a weather-tight seal therebetween. A pair of studs 52 are threaded into the cap 24 at their upper ends. Screws 54 pass through counter-bored openings in the flanges 46 and clearance openings in the base plate 48 into threaded openings in the lower ends of the studs 52 to securely clamp the casing 22 between the cap 24 and the base 20.

A flat rectangular bar member 56 extends lengthwise of the base plate 48 near the front edge thereof and is secured thereto by two screws 58 passing through counterbored openings in the member 56 into threaded openings in the base plate 48. Four vertically extending parallel plates 60, 62, 64 and 66 are clamped to each other and to the member 56 by means of four bolts, such as 68, which extend therethrough and have nuts, such as 70, threaded over their ends. Tubular spacers, such as 72, encompass these bolts to retain the vertical plates in the desired spaced apart relation.

The vertical plate 66 is composite in structure and comprises a pair of side plates 74, separated by a filler 76, which are bolted together by means of screws, such as 78. The filler 76 is made in two parts which are separated a predetermined distance to provide a coin chute, through which coins deposited in an opening in the side of the machine at 80 pass to the coin receiving drawer 38.

The operating mechanism of the machine is powered by a spring motor 82 from which is extended a shaft 84 journaled in the vertical plates 62 and 64 and provided with a square end portion 86. The shaft 84 is aligned with openings in the vertical plate 66 and the casing 22 through which a crank 88 may be inserted to engage the square portion 86 of the shaft when the spring motor is to be wound. In instances where electric power is available, the spring motor 82 may be wound automatically, or may be replaced entirely by an electric motor, if desired. A flat spiral spring (not shown) is secured at one end to the shaft 84 and is secured at its other end to a drum 90 secured to a spur gear 92 which is journaled on the shaft 84. A ratchet wheel 95 is secured to the shaft 84. A ratchet pawl 97 is pivoted on a stud extending from the plate 64 and is biased into engagement with the teeth of the ratchet wheel 95 by a flat spring 99 (Fig. 3) so as to permit the shaft 84 to be rotated in only a clockwise direction, as viewed from the left of Fig. 2. When the spring motor 82 has been wound, the spur gear 92 is biased to rotate in a clockwise direction, as viewed from the left of Fig. 2.

The spur gear 92 meshes with a pinion gear 94 which is secured to a shaft 96 journaled in the plates 62 and 64 and having a four-lobed cam 98 pinned to one end thereof for a purpose to be subsequently described. The spur gear 92 also meshes with a second pinion gear 100 which is secured to a shaft 102 journaled in the vertical plates 62 and 64. A spur gear 104 and a cam 106 are pinned to the portion of shaft 102 which extends through the vertical plate 62. The spur gear 104 meshes with a pinion gear 108 secured to a shaft 110 which is journaled in the vertical plates 60 and 62 and which carries a cam 112 for operating the stamping and coupon severing mechanism of the machine. The spur gear 104 also meshes with a second pinion gear 114 which is secured to a shaft 116 journaled in the vertical plates 60, 62 and 64 and having a cam 118 pinned to the end thereof which extends through the plate 64. The cam 118 is normally prevented from rotating and forms part of a single cycle clutch mechanism which is operated to permit the machine to go through a cycle of operations in response to the deposit of a coin therein, as will be subsequently described.

The ticket 120 shown in Figs. 8, 9 and 10 is illustrative of various forms which may be employed in conjunction with the machine. The ticket is substantially rectangular in form and is preferably made of a plurality of laminations of paper to provide a desired degree of stiffness. The left hand portion 122 of the ticket constitutes a stub and the right hand portion constitutes a plurality of coupons 124. The tickets are serially numbered and each of the coupons of a ticket bear the same serial number as the stub portion thereof for purposes of identification. If desired, different suffixes may be used after the serial number on the coupons in order to determine, after severance, what was the original position of each coupon. On the face of the ticket there may be imprinted the name of the city issuing the ticket, a list of the different traffic violations for which the ticket is to be used, with appropriate spaces for marking the particular violation for which a ticket is served; and instructions for using the ticket in conjunction with one of the automatic pay stations. On the rear side of the ticket there may be imprinted an explanation of the manner in which the tickets are to be used when a fine is to be paid, the locality in which pay stations are located, the penalties which may be imposed for nonpayment within a prescribed time limit, and other pertinent information. Spaces for the date of occurrence of the violation and for the signature of the officiating officer may also be provided on the rear of the ticket.

It is to be expected that the officer issuing tickets will keep a record of each violation, the identity of the offender, and the serial number of the ticket which is issued in every such case. For convenience in keeping such a record, the tickets 120 may be attached to stubs bearing corresponding serial numbers, and having appropriate provisions for noting the nature of the violation, and also the name and address of the violator. One of the tickets 120 may then be detached from its stub and given to the violator while the officer retains the stub as his report of the matter.

In order to prevent the pay station machine from functioning in the event that a ticket 120 is inserted with the wrong end foremost, i. e., with the stub portion 122 inserted instead of the coupon portion 124, one of the corners of the coupon portion of the tickets is cut off at 126. The pay station machine is arranged to detect whether it is the coupon or stub portion of a ticket that is inserted by testing the edge configuration of the ticket, this configuration being different along the coupon and stub portions thereof. Notches are provided between the coupons at 128 in order to maintain the same edge configuration of the coupon portion of the ticket after one or more coupons have been severed therefrom.

The operation of the ticket stamping and coupon severing mechanism will now be described with particular reference to Figs. 1, 2, 4, 6, 7, 11 and 12. To pay the fine imposed for a violation for which a ticket has been issued, the offender may repair to any pay station that is convenient to him. There he inserts the coupon portion of the ticket into a horizontal slot 130 (Fig. 2) provided in the casing 22 of the machine. The slot 130 is aligned with a slot 132 in the vertical plate 60, through which the ticket extends between the upper surface of the bar member 56 and a plate 134 spaced thereabove. The plate 134 is folded over along its short edges, as at 136 (Fig. 1), to space it above the upper surface of the member 56 a distance slightly greater than the thickness of the ticket 120. A pair of metal strips 138 extends along the short sides of the plate 134 to form guides for a printing ribbon 140 which extends over the upper surface of the plate 134. The strips 138 are folded over at their ends, as as 142 (Fig. 12), to space them from the plates 134. The strips 138 and the plate 134 are secured to the member 56 by means of four flat head screws, such as 144 (Fig. 11) passing through counter-sunk openings in the strips 138 and clearance openings in the plate 134 into threaded openings in the bar member 56.

The ribbon 140 is initially fully wound on a reel 146 which is journaled on a shoulder screw 148 threaded into a stud extending from the vertical plate 62 (Fig. 1). This reel has been omitted in Fig. 2 in order to reveal other details of construction of the mechanism. A flat spring 150 (Fig. 1), which is riveted to the vertical plate 62 at one end, bears against one face of the reel 146 at its other end to exert a braking effect thereon. The printing ribbon 140 extends from the reel 146 over a guide 152, between the strips 138 and the plate 134, thence over additional guides 152 to a take-up reel 154. The take-up reel 154 is journaled on a shoulder screw 156 threaded into a stud extending from the vertical plate 62. A disk 158, having a plurality of lugs 160 extending normally therefrom and spaced about its circumference, is journaled on the screw 156 and engages the take-up reel 154. The cam 106 has four teeth 162 spaced about its circumference at 90° intervals. During the operation of the mechanism, the shaft 102 rotates counter-clockwise, as viewed in Fig. 1, causing the teeth 162 to engage the lugs 160 to rotate the take-up reel 154 in a clockwise direction in small increments. The ribbon 140 is thus advanced a short distance each time that the mechanism is operated, whereby by the inking surface presented to the stamping mechanism is frequently replenished.

A pair of guide rods 164 extends vertically from the bar member 56 at each end of the plate 134 (Figs. 1, 2 and 4). A carriage 166 is slidably mounted on these guide rods. A crank arm 168 extends into a central opening in the carriage 166 and is secured thereto by means of a pivot pin 171. The crank arm 168 encompasses the eccentric cam or crank 112 at its other end, whereby the carriage 166 moves downwardly towards the plate 134 during the first half cycle of operations of the mechanism and is returned to the position shown in Fig. 1 during the second half cycle of operations.

A printing plate 170 is secured to the under side of the carriage 166 in alignment with a rectangular opening in the plate 134, so that the printing plate is pressed against a ticket inserted in the machine to stamp it "PAID" when the carriage 166 is lowered in response to the deposit of a coin in the machine. If desired, the carriage 166 may also carry a set of printing wheels, bearing the date and time of day and driven by a suitable clockwork, to imprint the time of deposit on the ticket at the same time that it is marked "PAID." The carriage 166 also carries a knife 172 which is secured thereto by screws, such as 174, passing through counter-sunk openings in the knife 172 into threaded openings in the carriage 166. The knife 172 is aligned with the rear edge of the bar member 56, the upper rear corner of which forms a shearing edge that cooperates with the knife 172 to sever one of the coupons 124 from a ticket 120 when the carriage 166 is lowered. The base plate 48 is provided with a rectangular opening 176 through which the severed coupon falls into the coupon-receiving drawer 36.

In order to accurately locate the ticket in the machine, a stop plate 178 formed of sheet metal is secured to the base plate 48 along the rear edge of the rectangular opening 176 therein. The stop plate is spaced from the shearing edge of the bar member 56 a distance equal to the width of one of the coupons 124. The lowermost portion of the stop plate 178 also serves as a deflecting plate to guide the severed coupon into the drawer 36.

As may best be seen in Figs. 11 and 12, a rocker arm 179 is pivotally secured to a stud 180, extending from the base plate 48 behind the stop plate 178, by means of a shoulder screw 182. Feelers 184 and 186 extend from the rocker arm 179 through vertical slots provided in the stop plate 178 at each end thereof. The rocker arm 179 is biased to rotate in a clockwise direction, as viewed from above, by means of a coil spring 188. When one of the tickets 120 is properly inserted in the machine, the leading edge of the ticket engages the feeler 186 and causes it to rotate the rocker arm 179 counter-clockwise to the position shown in Fig. 11. The beveled corner of the ticket provides space for the feeler 184 to extend forward of the stop plate 178. If the stub portion of the ticket is inserted in the machine instead of the coupon portion thereof, the leading edge of the ticket will bear against both of the feelers 184 and 186 and will consequently prevent movement of the rocker arm 179 into the position shown in Fig. 11. Since only one corner of the ticket is beveled, the rocker arm will not be rotated to the required position even though the coupon portion of the ticket is inserted in the machine first, if the ticket is inserted upside down. This arrangement prevents the machine from being operated when a ticket is inserted therein upside down, thus avoiding the confusion which would result if a ticket could be stamped on either side, which would be particularly confusing if a ticket were stamped more than once and was inverted between successive stampings.

A lever arm 190 (Fig. 2), pivoted to a bracket 192 extending from the vertical plate 64, is pivotally attached to the rocker arm 179 at its lowermost end. At its upper end, the lever arm 190 is pivotally attached to a pin 194 which extends through the plate 66 to form an obstruction in the coin chute provided therein. When the rocker arm 179 is rotated to the position shown in Fig. 11, upon the proper and full insertion of a ticket having the required edge configuration, the pin 194 is withdrawn from the plate 66 so as to clear the coin chute and permit the coins to be inserted in the machine. If desired, the pin 194 may be located, as at 194*a* (Fig. 5) so as to permit a coin to be inserted, but to obstruct the passage thereof through the coin chute. In this case the coin may be inserted first and the ticket last, the deposit of the coin being automatically deferred until the coin chute is cleared by the proper and full insertion of the ticket.

The operation of the machine in response to the deposit of a coin therein will now be described with particular reference to Figs. 1, 2, 5, 6 and 7. After a ticket has been properly inserted in the machine so as to effect the withdrawal of the blocking pin 194 from the coin chute, a coin 196 is inserted to move through the opening provided in the casing 22 at 30. As noted in the previous paragraph, the coin may be inserted first when the blocking pin is located at 194*a*. The coin 196 is propelled by gravity through the coin chute, defined by the side plates 74 and the filler 76, and thence through the opening 198 in the base plate 48 into the coin receiving drawer 38. During its travel through the coin chute, the coin 196 strikes a pin 200 which extends through an opening in the plate 66. This pin is carried by a trip lever 202 which is pivoted on a shoulder screw 204 threaded into a stud extending from the vertical plate 64. The trip lever 202 is biased to rotate in a counter-clockwise direction, as viewed in Fig. 5, by a coil spring 206. The counter-clockwise movement of the trip lever is limited by a pin 208 extending from the vertical plate 64. At its uppermost end the trip lever 202 supports a block 210 secured to a push rod 212, which is slidably secured in bearing blocks 214 attached to the vertical plate 64. The push rod 212 is biased to move downwardly by a compression spring 216 extending between the block 210 and the upper bearing block 214. At its uppermost end, the push rod 212 carries a forked head 218 to which a stop lever 220 is pivotally connected at one end by a pin 222. The stop lever 220 is fulcrumed on a shoulder screw 24 threaded into a stud extending from the vertical plate 64, and engages the cam 118 at its other end to prevent rotation thereof, thereby preventing operation of the spring motor 82.

When the coin 196 strikes the pin 200, the trip lever 202 is pivoted in opposition to the biasing spring 206, causing the upper end of the trip lever to be disengaged from the block 210. The push rod 212 is consequently allowed to descend, causing the stop lever 220 to be pivoted out of engagement with the cam 118. As soon as the stop lever 220 is disengaged from the cam 118, the spring motor 82 drives the shaft 110 through the gear train 92, 100, 104 and 108 to cause the carriage 166 to descend. The knife 172 severs the outermost coupon 124 from the ticket 120 during the descent of the carriage 166 and the printing plate 170 is pressed firmly against the stub portion of the ticket with the printing ribbon 140 interposed therebetween. The portion of the member 56 which underlies the printing plate 170 is provided with a recess in which there is disposed a block 226 (Fig. 12) of resilient material, such as rubber, which serves as a tympan.

The shafts 110 and 116 are driven at the same speed, consequently the cam 118 will have rotated through one-half of a revolution during the descent of the carriage 166. During the ensuing half revolution of the cam 118, the carriage 166 is returned to the elevated position shown in Fig. 6. During the time that the cam 118 completes one revolution, the cam 98 is rotated through a quarter revolution by the pinion gear 94. As the cam 98 rotates through a quarter of a revolution, one of the four lobes formed thereon passes beneath the bottom of the push rod 212 and raises it so that the trip lever 202 may then restore to its normal position where its uppermost end lies beneath the block 210. As the cam 98 completes its quarter revolution, the lobe thereon which raised the push rod 212 is rotated slightly beyond the push rod, which is thereafter prevented from descending by the trip lever 202. The resetting of the push rod 212 by the cam 98 causes the stop lever 220 to again be positioned in the path of the lobe on the cam 118, and consequently prevents further rotation thereof upon the completion of one revolution.

If more than one coin is required to complete payment of the fine for which the ticket 120 has been issued, the above cycle of operations may be repeated, as necessary. It will be noted that each time that a coupon is severed from the ticket, the rocker arm 179 is restored to its normal position by the biasing spring 188 and consequently the pin 194 is moved into the position where it obstructs the coin chute. The insertion of additional coins, or the passage of inserted coins through the coin chute, is thus obstructed until the ticket 120 has been advanced into a position where another coupon will be severed therefrom during the next cycle of operations of the machine. This arrangement prevents any possibility of the payer being cheated as the result of improper operation on his part.

It should now be apparent that the automatic pay station which I have provided is substantially foolproof in operation, and constitutes a great convenience to violators because they may pay off the assessed fines at once at the nearest station. While the machine illustrating the invention has been described as employed to effect the collection of traffic fines, it should be understood that, as previously noted, it may be employed for the settlement of any indebtedness, account, or the like, in instances where it is desirable to be able to collect coins, to retain a record of the depositors of the coins, and to provide the depositor with a receipt for the deposit.

While the invention has been illustrated by the disclosure of a particular embodiment thereof, it should be apparent that various modifications may be made without departing from the invention in its broader aspects, and therefore the aim in the appended claims is to cover all such modifications as fall within the true spirit and scope of the invention.

Having thus described the invention, what is claimed as new and desired to be secured by Letters Patent is:

1. A validating pay station machine comprising a motor, means operatively connected with the motor and actuated by the same for severing a coupon from a ticket inserted in the machine by a payer, means for normally holding the motor inoperative including a trip lever actuated by a coin deposited in the machine for releasing the motor for causing the same to operate the coupon severing means, a movable stop arranged to prevent the introduction of a coin into the machine, a member connected with the movable stop and arranged to be actuated by the insertion of a ticket into the machine for actuating said member to move the stop to an inoperative position to permit the introduction of a coin into the machine.

2. A validating pay station machine comprising a motor, means operatively connected with the motor and actuated by the same for severing a coupon from a ticket inserted in the machine by a payer, means for normally holding the motor inoperative including a trip lever actuated by a coin deposited in the machine for releasing the motor for causing the same to operate the coupon severing means, a movable stop arranged to prevent the introduction of a coin into the machine, and a member connected with the movable stop and having feelers actuated by a particular configuration of ticket edge to move the stop to an inoperative position to permit the introduction of a coin into the machine.

3. A validating pay station machine comprising a motor, means operatively connected with the motor and actuated by the same for marking a ticket inserted in the machine by a payer, means for normally holding the motor inoperative including a trip lever actuated by a coin deposited in the machine for releasing the motor for causing the same to operate the ticket marking means, a movable stop arranged to prevent the introduction of a coin into the machine, and a member connected with the movable stop and arranged to be actuated by the insertion of a ticket into the machine to move the stop to an inoperative position to permit the introduction of a coin into the machine.

4. A validating pay station machine comprising a motor, means operatively connected with the motor and actuated by the same for marking a ticket inserted in the machine by a payer, means for normally holding the motor inoperative including a trip lever actuated by a coin deposited in the machine for releasing the motor for causing the same to operate the ticket marking means, a movable stop arranged to prevent the introduction of a coin into the machine, and a member connected with the movable stop and having feelers actuated by a particular configuration of ticket edge to move the stop to an inoperative position to permit the introduction of a coin into the machine.

5. A validating pay station machine comprising a motor, means connected with and actuated by the motor for severing a coupon from a ticket inserted in the machine by the payer, means operatively connected with the motor and actuated by the same for marking the ticket, means for normally holding the motor inoperative including a trip lever actuated by a coin deposited in the machine for releasing the motor for causing the same to operate the coupon severing means and the ticket marking means, a movable stop arranged to prevent the introduction of a coin into the machine, and a member connected with the movable stop and arranged to be actuated by the insertion of a ticket into the machnie to move the stop to an inoperative position to permit the introduction of a coin into the machine.

6. A validating pay station machine comprising a motor, means connected with and actuated by the motor for severing a coupon from a ticket inserted in the machine by the payer, means operatively connected with the motor and actuated by the same for marking the ticket, means for normally holding the motor inoperative including a trip lever actuated by a coin deposited in the machine for releasing the motor for causing the same to operate the coupon severing means and the ticket marking means, a movable stop arranged to prevent the introduction of a coin into the machine, and a member connected with the movable stop and having feelers actuated by a particular configuration of ticket edge to move the stop to an inoperative position to permit the introduction of a coin into the machine.

7. A validating pay station machine comprising a motor, means operatively connected with the motor and actuated by the same to sever a coupon from a ticket inserted in the machine by the payer, a coin passage, means for holding the motor normally inoperative including a trip lever actuated by a coin deposited in the coin passage for releasing the motor for causing the same to actuate the coupon severing means, means for normally obstructing the coin passage of the machine, and a member connected with the coin passage obstructing means and arranged to be actuated by the insertion of a ticket in the machine to withdraw the coin obstructing means from the coin passage to permit the introduction of a coin into the machine.

8. A validating pay station machine comprising a motor, means operatively connected with the motor and actuated by the same for marking a ticket inserted in the machine by the payer, a coin passage, means for holding the motor normally inoperative including a trip lever, means for normally obstructing the coin passage of the machine, and a member connected with the coin passage obstructing means and arranged to be actuated by the insertion of a ticket in the machine for withdrawing the coin obstructing means from the coin passage to permit the introduction of a coin into the machine, said trip lever being arranged to be actuated by a coin for releasing the motor for causing the same to operate the ticket marking means.

9. A validating pay station machine including a motor, means operatively connected with the motor and actuated by the same to sever a coupon from a ticket inserted in the machine by a payer, means operatively connected with the motor and actuated by the same for marking the ticket, a coin passage, means for holding the motor normally inoperative including a trip lever, means for normally obstructing the coin passage of the machine, and a member connected with the coin passage obstructing means and arranged to be actuated by the insertion of a ticket in the machine for moving the said member to withdraw the coin obstructing means from the coin passage to permit the introduction of a coin into the machine, said trip lever being arranged to be actuated by a coin for releasing the motor for causing the same to operate the coupon severing means and the ticket marking means.

10. A validating pay station machine including a motor, means operatively connected with the motor and actuated by the same to sever a coupon from a ticket inserted in the machine by a payer, a coin passage, means for holding the motor normally inoperative including a trip lever actuated by a coin deposited in the machine for releasing the motor for causing the same to operate the coupon severing means, means for normally obstructing the coin passage of the machine, and a member connected with the coin passage obstructing means and having feelers actuated by a particular configuration of ticket edge to withdraw the coin passage obstructing means from the coin passage to permit the introduction of a coin into the machine.

11. A validating pay station machine comprising a motor, means operatively connected with the motor and actuated by the same for marking a ticket inserted in the machine by a payer, a coin passage, means for holding the motor normally inoperative including a trip lever actuated by a coin deposited in the machine for releasing the motor for causing the same to operate the ticket marking means, means for normally obstructing the coin passage of the machine, and a member connected with the coin passage obstructing means and having feelers actuated by a particular configuration of ticket edge to withdraw the coin obstructing means from the coin passage to permit the introduction of a coin into the machine.

12. A validating pay station machine including a motor, means operatively connected with the motor and actuated by the same to sever a coupon from a ticket inserted in the machine by a payer, means operatively connected with the motor and actuated by the same for marking the ticket, a coin passage, means for normally holding the motor inoperative including a trip lever actuated by a coin deposited in the machine for releasing the motor for causing the same to operate the coupon severing means and the ticket marking means, and a member connected with the coin passage obstructing means and having feelers actuated by a particular configuration of ticket edge to withdraw the coin passage obstructing means from the coin passage to permit the introduction of a coin into the machine.

13. A validating pay station machine comprising a power shaft, means for rotating the same, means operatively connected with the power shaft and actuated by the same for severing a coupon from a a ticket inserted in the machine by a payer, means for normally holding the power shaft against rotation including a trip lever, a movable stop arranged to prevent the introduction of a coin into the machine, and a member connected with the movable stop and arranged to be actuated by the insertion of a ticket in the machine to move the stop to an inoperative position and permit the introduction of a coin into the machine, said lever being arranged to be actuated by a coin inserted in the machine for releasing the power shaft to permit rotation of the same for actuating the coupon severing means.

14. A validating pay station machine comprising a power shaft, means for rotating the same, means operatively connected with the power shaft and actuated by the same for marking a ticket inserted in the power by a payer, means for normally holding the power shaft against rotation including a trip lever, a movable stop arranged to prevent the introduction of a coin into the machine, and a member connected with the movable stop and arranged to be actuated by the insertion of a ticket in the machine to move the stop to an inoperative position and permit the introduction of a coin into the machine, said lever being arranged to be actuated by a coin inserted in the machine for releasing the power shaft to permit rotation of the same for actuating the ticket marking means.

ROBERT F. BROUSSARD.

REFERENCES CITED

The following references are of record in the file of this patent:

UNITED STATES PATENTS

| Number | Name | Date |
|---|---|---|
| 366,303 | Clawson | July 12, 1887 |
| 845,865 | Fodor | Mar. 5, 1907 |
| 1,461,613 | Gilbert | July 10, 1923 |
| 1,468,592 | Comfort | Sept. 18, 1923 |
| 1,506,491 | Kline | Aug. 26, 1924 |
| 1,581,339 | Fox | Apr. 20, 1926 |
| 1,695,593 | Landenberger | Dec. 18, 1928 |
| 1,850,093 | Brand | Mar. 22, 1932 |
| 1,866,871 | Watling | July 12, 1932 |
| 2,101,615 | Friedrichs | Dec. 7, 1937 |
| 2,213,240 | Clausen | Sept. 3, 1940 |
| 2,285,056 | Ruska | June 2, 1942 |
| 2,328,858 | Sweetland | Sept. 7, 1943 |